United States Patent

Sato et al.

[11] Patent Number: 5,489,458
[45] Date of Patent: Feb. 6, 1996

[54] FLOORING MATERIAL FOR WIRING

[75] Inventors: Minoru Sato; Isao Nakashima, both of Gifu; Kenji Abe, Tokyo; Hideo Maeyama, Wako; Hirohiko Ishiwatari, Room No. 302, 6-25, Akabane 3-chome, Kita-ku, Tokyo, all of Japan

[73] Assignees: Mitsubishi Burlington Co., Ltd.; Hirohiko Ishiwatari, both of Tokyo, Japan

[21] Appl. No.: 351,540

[22] Filed: Dec. 7, 1994

[30] Foreign Application Priority Data

Dec. 7, 1993 [JP] Japan ................................. 5-306208
Dec. 22, 1993 [JP] Japan ................................. 5-324095
Sep. 26, 1994 [JP] Japan ................................. 6-229758

[51] Int. Cl.⁶ ............................ E04F 15/18; H02G 3/26
[52] U.S. Cl. ........................... 428/40; 52/220.8; 428/41; 428/42; 428/137; 428/138; 428/167; 428/354; 428/285; 428/286; 428/457; 428/537.1; 428/537.5
[58] Field of Search ................... 428/40, 41, 42, 428/43, 137, 138, 167, 354, 192, 285, 286, 253, 263, 457, 537.1, 537.5; 52/220.8

[56] References Cited

U.S. PATENT DOCUMENTS 4,983,438 1/1991 Jameson ..................... 428/42
5,310,589 5/1994 Nagashima ................. 428/42

FOREIGN PATENT DOCUMENTS 4-281956 10/1992 Japan.

Primary Examiner—Nasser Ahmad
Attorney, Agent, or Firm—Oblon, Spivak, McClelland, Maier & Neustadt

[57] ABSTRACT

A flooring material is composed by interpositioning at least one intermediate layer (2), in the form of a sheet that is weakly adhered to a sheet base material (1) to an extent that at least its upper surface can be easily peeled from said sheet base material (1), within said sheet base material corresponding to the bottoms of wiring grooves (6 and 7) formed in said sheet base material (1). A plurality of cuts are made along cut lines (4 and 5) of said flooring material at a depth that extends to the above-mentioned intermediate layer (2) at prescribed intervals. Wiring grooves (6 and 7) are formed by peeling off portions (1a and 1b) of the sheet base material (1) within said cut lines to enable wiring along said grooves (6 and 7).

8 Claims, 4 Drawing Sheets

FLOORING MATERIAL FOR WIRING

BACKGROUND OF THE INVENTION

1. Field of the Invention

The present invention relates to improvement of a flooring material for wiring that is positioned between a carpet and a floor surface and used for wiring cables.

2. Description of the Related Art

An example of a flooring material of the prior art is proposed in Japanese Unexamined Patent Publication (Kokai) No. 4-281956. This example of a flooring material of the prior art is used for wiring cable, and has a resin sheet affixed to one of its surfaces that is adhered to the floor surface, while the other surface has a cushioning material on which releasing paper is laminated with an adhesive layer in between.

When laying carpeting over this flooring material, two parallel cut lines are made at a desired width in the cushioning material at a prescribed depth from the releasing paper surface. The cushioning material between these cut lines is removed to form a groove for wiring cable.

However, since the entire cushioning material of the flooring material for wiring of the prior art is of the same material (e.g. polyurethane), when removing the cushioning material from between two parallel cut lines, even in the case the depth of the cut groove along the cut lines is constant, it was not possible to regulate the thickness of the cushioning material removed, and a groove having a uniform depth along its bottom surface in the lengthwise direction could not be formed. In addition, in the case the cushioning material removed from between the cut lines is narrow and has low strength, since it tears easily when removed, the prior art also had the problem of this groove formation work being extremely bothersome.

SUMMARY OF THE INVENTION

In order to eliminate the problems of the prior art as described above, the primary object of the present invention is to provide a flooring material for wiring cable that enables wiring grooves having a desired width and depth to be formed both extremely easily and reliably.

In order to eliminate the problems described above, the present invention employs the following means.

Namely, a first gist of the present invention is a flooring material for wiring wherein at least one intermediate layer, consisting of a sheet substance that is weakly adhered to an extent such that at least the upper surface can be easily peeled from a sheet base material, is interpositioned within said sheet base material corresponding to the bottoms of wiring grooves formed in said sheet base material, and preferably, a plurality of cut lines, of a depth that extends from the upper surface of the sheet base material to at least the upper surface of the intermediate layer, are provided in advance at suitable intervals in the vertical and/or horizontal direction.

In addition, a second gist of the present invention is a flooring material for wiring wherein an at least one intermediate layer, consisting of a sheet substance that together with being weakly adhered to an extent such that at least the upper surface can be easily peeled from a sheet base material, the upper surface is more strongly adhered to the sheet base material than the lower surface, is interpositioned within the sheet base material corresponding to the bottoms of wiring grooves formed in said sheet base material, and preferably, a plurality of cut lines, of a depth that extends from the upper surface of the sheet base material to at least the lower surface of the intermediate layer, are provided in advance at suitable intervals in the vertical and/or horizontal direction.

Moreover, a third gist of the present invention is a flooring material for wiring wherein at least one intermediate layer, consisting of a laminated sheet substance which can be easily peeled from between layers, and of which its upper and lower surfaces are adhered to a sheet base material stronger than the interlayer adhesion of the laminated sheet substance, is interpositioned within the sheet base material corresponding to the bottoms of wiring grooves formed in said sheet base material, and preferably, a plurality of cut lines, of a depth that extends from the upper surface of the sheet base material to at least between the layer of the intermediate layer, are provided in advance at suitable intervals in the vertical and/or horizontal direction.

In addition, a fourth gist of the present invention is a flooring material for wiring wherein a sheet base material is divided into upper and lower portions at the position of said sheet base material corresponding to the bottoms of wiring grooves formed in said sheet base material, the upper base material portion and lower base material portion are directly and weakly adhered to an extent that they can be easily peeled from each other, and preferably, a plurality of cut lines, of a depth that extends from the upper surface of the upper base material portion to at least the upper surface of the lower base material portion, are provided at suitable intervals in the vertical and/or horizontal direction.

DESCRIPTION OF THE PREFERRED EMBODIMENTS

The following provides a detailed explanation of the mode of operation of the present invention based on the drawings.

Figure 1:
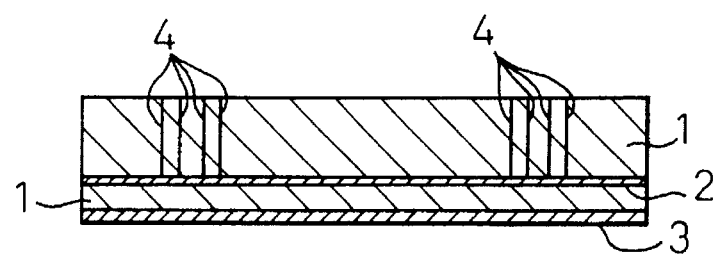
FIG. 1 is a cross-sectional view indicating a typical example of the constitution of a flooring material for wiring as claimed in a first gist of the present invention.
Figure 2:
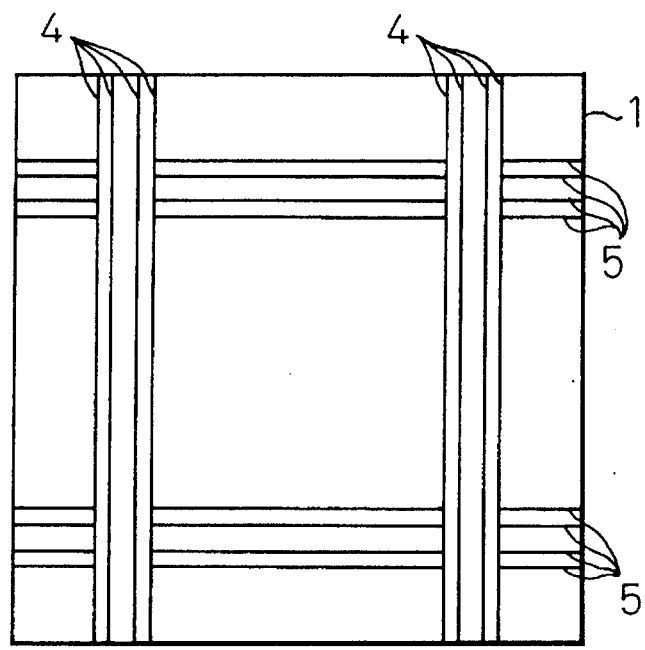
FIG. 2 is an overhead view of the flooring material for wiring shown in FIG. 1.

FIG. 1 is a cross-sectional view indicating one example of a flooring material for wiring as claimed in the first gist of the present invention. FIG. 2 is an overhead view of that shown in FIG. 1. In these drawings, reference numeral 1 refers to a sheet base material, reference numeral 2 refers to an intermediate layer consisting of a sheet substance, and reference numeral 3 refers to a support material having a material similar to intermediate layer 2 that is laminated onto one of the surfaces of base material 1 to maintain the shape of said base material 1 (use of this support material is not essential, however).

The material of base material 1 may be the same or different for the upper and lower portions of the intermediate layer. In addition, although the type must be such that the base material of the upper portion of the intermediate layer enables the cuts of the grooves to be formed easily, the base material of the lower portion of the intermediate layer is not subjected to any particular limitations since it is not necessary to form the cuts of the grooves. Thus, plastic, rubber, wood, metal or various other kinds of inorganic materials can be used. Furthermore, synthetic resins such as polyvinyl chloride (PVC), polyurethane and ethylene-vinyl acetate copolymer, recycled products of these synthetic resins that have been separated from various types of waste and recycled, as well as the foam forms of these resins are used preferably for the upper and lower portions.

Non-woven fabric, woven fabric, knitted fabric, paper, film (including film formed by applying a releasing agent or adhesive) and thin sheets can be used for the sheet substance that composes the intermediate layer. There are no particular limitations on this material in the case it is not necessary to make cuts into the material to its lower portion during formation of the cuts of the grooves.

Intermediate layer 2 is arranged at a position inside base material 1 corresponding to the bottoms of wiring grooves that are formed. In addition, its upper surface is weakly adhered to an extent that it can be easily peeled from base material 1. The other lower surface may be weakly adhered to base substrate 1 in the same manner as the upper surface, or it may be adhered stronger than the upper surface.

The sheet substance used for said intermediate layer 2 has weak adherence with base material 1. For example, in the case of composing the base material with polyvinyl chloride, a textile fabric made of glass fiber, cellulose fiber, polyester fiber, polyolefine fiber or polyamide fiber either alone or as a blend of two or more types (nonwoven fabric, woven fabric, knitted fabric and so forth), a film made of polyester, polyolefine or polyamide and so forth, or known releasing papers, etc. are used preferably. In addition, instead of using a sheet substance formed in advance for the intermediate layer, it is also preferable to apply releasing agent or adhesive having a low level of adhesive strength with respect to the base material onto the upper surface of the lower base material, and laminate the upper base material on top to form an intermediate layer consisting of a thin film of releasing agent or adhesive between the upper and lower base materials.

The following provides an explanation of a method for forming wiring grooves using the flooring material composed in the manner described above. In FIGS. 1 and 2, sets of four parallel cut lines 4 and 5, of a depth extending from the upper surface of base material 1 to the upper surface of intermediate layer 2, are cut vertically and horizontally, respectively, in advance at a prescribed interval. In the case of forming a narrow wiring groove in the vertical direction, by peeling off portion 1a of base material 1 located between the two inside cut lines 4 of the four cut lines 4 as shown on the left side of FIG. 3, since the upper surface of intermediate layer 2 is weakly adhered to an extent that it can be easily peeled from base material 1, said peeled off portion 1a of base material 1 can be easily peeled off from the upper surface of intermediate layer 2 with only slight force. Accordingly, wiring groove 6 is symmetrically formed having a desired width and depth.

Furthermore, in the case both the lower and upper surfaces of intermediate layer 2 are similarly weakly adhered to base material 1, if cut lines 4 are cut to a depth that extends to the lower surface of intermediate layer 2, portion 1a of base material 1 can be peeled off together with a portion of intermediate layer 2 from the lower surface of said intermediate layer 2. In addition, in the case of peeling off portion 1a of base material 1 from the upper surface of intermediate layer 2, accommodation can be made by making the depth of cut lines 4 to extend to the upper surface of intermediate layer 2.

Figure 3:
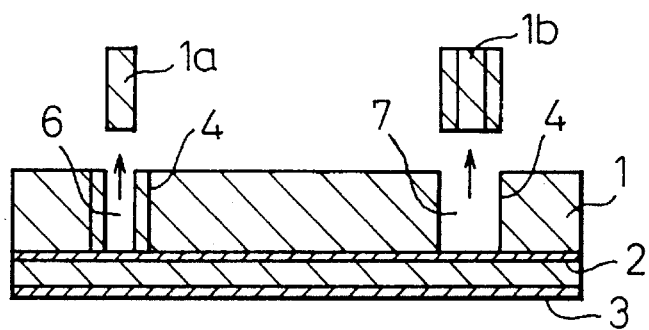
FIG. 3 is a cross-sectional view indicating one example in the case of forming wiring grooves using the flooring material for wiring shown in FIG. 1.

In addition, in the case of forming a wide wiring groove, by peeling off portion 1b of base material 1 located between the two outside cut lines 4 of the four cut lines 4 as shown on the right side of FIG. 3 from the upper surface (or lower surface) of intermediate layer 2, wiring groove 7 can be easily and reliably symmetrically formed to have a prescribed width and depth in the same manner as the case described above.

Figure 4:
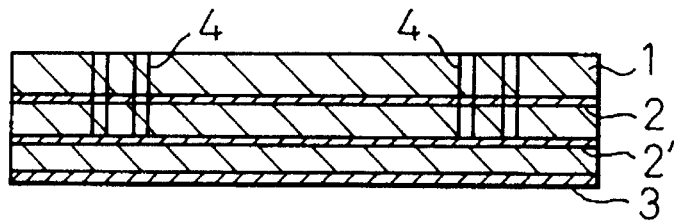
FIG. 4 is a cross-sectional view indicating another example of the constitution of a flooring material for wiring as claimed in the first gist of the present invention.

Furthermore, by making the number of cut lines 4 provided in advance to be five or more, the range of selection of groove width can be further expanded. In addition, if two intermediate layers 2 and 2' are provided as shown in FIG. 4, wiring groove can be formed while suitably selecting the depth of the groove between a shallow groove that extends to intermediate layer 2 or a deep groove that extends to intermediate layer 2'. Moreover, by making the number of intermediate layers to be three or more, the range of selection of groove depth can be further expanded. In this case, if different colors are used for base material 1 above and below a plurality of intermediate layers 2 and 2', the location and number of the intermediate layers can be easily distinguished.

Figure 5:
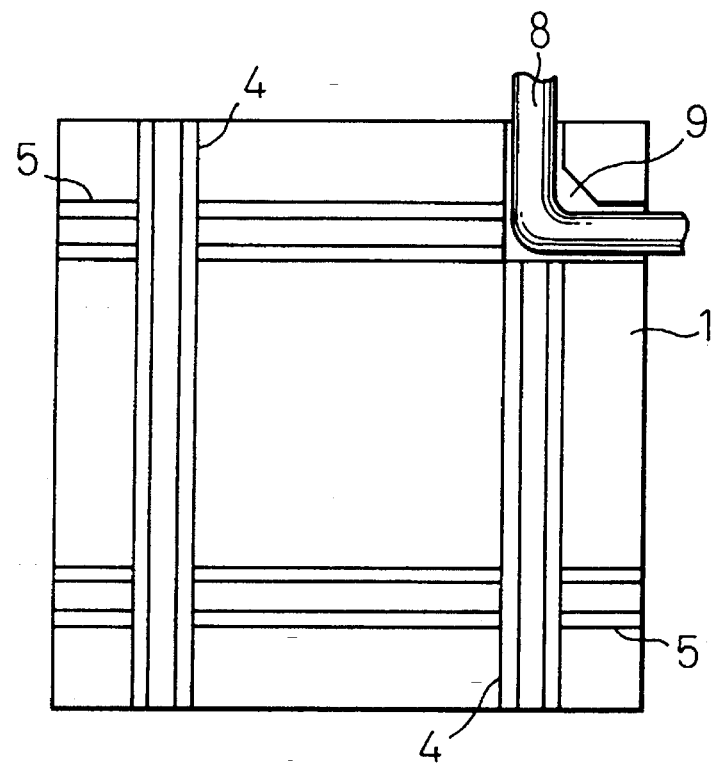
FIG. 5 is an overhead view of a flooring material for wiring indicating an example of forming bent wiring grooves at a vertical and horizontal intersection using the flooring material for wiring shown in FIG. 1.

In addition, as shown in the upper right corner of FIG. 5, if vertical and horizontal wiring grooves are provided so as to intersect, cable 8 can be bent during wiring by following along the intersecting grooves. In this case, if corner portion 9 is bevel cut at the intersection of vertical and horizontal grooves, and a triangular portion of said corner portion 9 is pulled part and removed, cable 8 can be easily bent during wiring.

Furthermore, in the example described above, although cuts along cut lines 4 and 5 for forming wiring grooves 6 and 7 are provided in advance to make work at the site as simple as possible, instead of providing these cuts in advance as described above, wiring grooves of a prescribed width and depth can also naturally be formed by suitably providing cuts having a depth that extends to at least the upper surface of intermediate layer along cut lines 4 and 5 by using a suitable cutter at the site.

Figure 6:
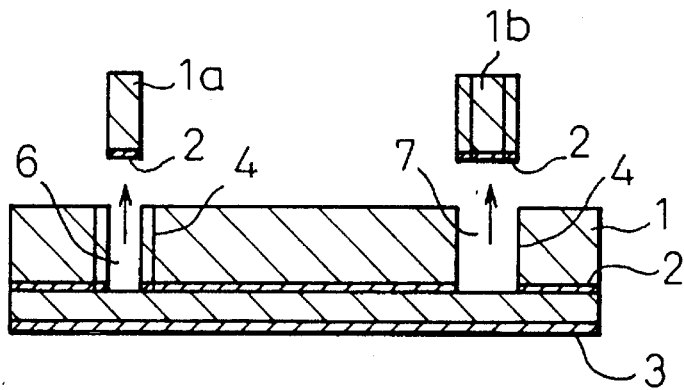
FIG. 6 is a cross-sectional view of a flooring material for wiring indicating an example of the case of forming wiring grooves using a flooring material for wiring as claimed in the second gist of the present invention.

FIG. 6 is a cross-sectional view of a flooring material for wiring that indicates an example of the case of forming wiring grooves using a flooring material for wiring as claimed in the second gist of the present invention. In the flooring material for wiring shown in this drawing, cut lines 4 are cut to a depth that extends to the lower surface of intermediate layer 2. Moreover, together with the lower surface of intermediate layer 2 being weakly adhered to an extent that it can be easily peeled from base material 1, since the upper surface of intermediate layer 2 is more strongly adhered to base material 1 than the lower surface, when portions 1a and 1b of base material 1 are peeled off, these portions 1a and 1b of base material 1 are peeled off with a portion of intermediate layer 2 still adhered to their lower surfaces. Since portions 1a and 1b of base material 1 that are peeled off in this manner can be peeled off from the lower surface of intermediate layer 2 with only slight force while in the state of being reinforced by a portion of intermediate layer 2, even if, for example, these portions 1a and 1b of base material 1 are narrow and of low strength, they are not torn when peeled off, thus offering the advantage of enabling wiring grooves to be formed both rapidly and reliably.

Furthermore, together with the lower surface of intermediate layer 2 being weakly adhered to an extent that it can be easily peeled from a base material, its upper surface is more strongly adhered to base material 1 than its lower surface. Various types of methods can be used to accomplish this. As one example, in the case of composing base material 1 with, for example, polyvinyl chloride, a mixed non-woven fabric consisting of 70% of a fiber such as polyester, polyolefine or polyamide, and 30% of a binder fiber made of polyvinyl alcohol is used, and the structure of that non-woven fabric is made to be such that a large amount of binder fiber is unevenly distributed on the upper surface of the non-woven fabric. As an example of alternative methods, a non-woven fabric consisting of 100% of the above-mentioned fiber is used, single-sided embossing is performed, and together with forming the lower surface into the form of a flat film, the upper surface is made to be uneven. The surface area on the upper surface that adheres with the resin of the base material along with anchor effects are increased, a releasing agent is applied onto the non-woven fabric consisting of 100% of the above fiber as well as onto the lower surface of a film or thin sheet made of polyester, polyolefine or polyamide, or releasing paper is used on which releasing agent is applied on its lower surface.

Figure 7:
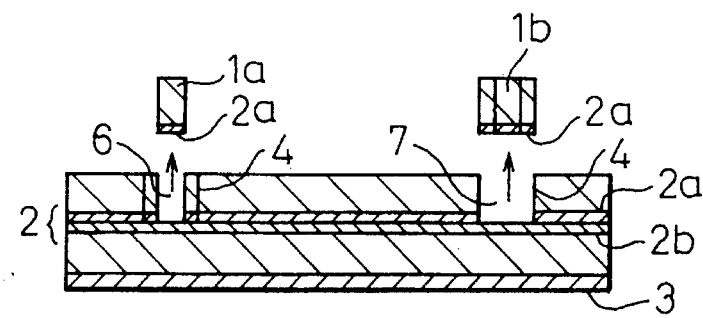
FIG. 7 is a cross-sectional view of a flooring material for wiring indicating an example of the case of forming wiring grooves using a flooring material for wiring as claimed in the third gist of the present invention.

FIG. 7 is a cross-sectional view of a flooring material for wiring indicating one example of the case of forming wiring grooves by using the flooring material for wiring as claimed in the third gist of the present invention. In the flooring material for wiring in this drawing, intermediate layer 2 is composed of a sheet substance wherein upper layer 2a and lower layer 2b are laminated so as to be able to be easily peeled between layers. Moreover, together with its upper and lower surfaces being more strongly adhered to base material 1 than the interlayer adhesion of the laminated sheet substance, since cuts are formed along cut lines 4 and 5 at a depth that extends from the upper surface of base material 1 to between layers of intermediate layer 2, when portions 1a and 1b of base material 1 are peeled off, these portions 1a and 1b can be peeled off with only slight force from the laminated surface of the upper layer and lower layer with a portion of upper layer 2a of intermediate layer 2 still adhered to its lower surface in the state in which they are reinforced by this portion of upper layer 2a. Thus, similar to the example shown in FIG. 6, even if portions 1a and 1b are narrow and have low strength, they are not torn during peeling, thus offering the advantage of enabling wiring grooves to be formed both rapidly and reliably.

In addition, if a laminated fiber non-woven fabric is used for the laminated sheet substance that composes intermediate layer 2 in this case, wherein two sheets of a mixed non-woven fabric of a fiber consisting of glass fiber, cellulose fiber, polyester fiber, polyolefine fiber or polyamide fiber either alone or as a mixture of two or more types in the case of composing base material 1 with, for example, polyvinyl chloride, and a binder fiber consisting of polyvinyl alcohol, are lightly laminated and adhered, although the upper and lower surfaces of said laminated fiber non-woven fabric are strongly adhered to base material 1 by the binder fiber consisting of polyvinyl alcohol resin, having a high degree of compatibility with the resin composing base material 1, since the laminated surface of the laminated fiber non-woven fabric makes hardly any contact with the resin that composes base material 1, it can be maintained in a state in which it can be easily peeled between layers. In addition, two sheets of non-woven fabric, woven fabric, knitted fabric, paper, film or thin sheet, which are either lightly fused or lightly adhered with an adhesive having weak adhesive force, are used preferably.

Figure 9:
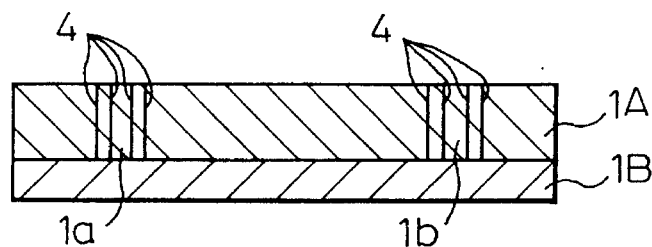
FIG. 9 is a cross-sectional view indicating a typical example of the constitution of a flooring material for wiring as claimed in the fourth gist of the present invention.

FIG. 9 is a cross-sectional view indicating an example of a flooring material for wiring as claimed in the fourth gist of the present invention. In the flooring material for wiring in this drawing, intermediate layer 2 like that used in the first through third inventions is not present. Instead, upper base material 1A and lower base material 1B are directly adhered to an extent that they can be easily peeled apart. Moreover, since cut lines 4 are provided to a depth extending from the upper surface of the upper base material to the upper surface of the lower base material, when portions 1a and 1b of the base material are peeled off in the same manner as the case shown in FIG. 3, portions 1a and 1b can be easily peeled off with only a weak force from the interface between upper base material 1A and lower base material 1B as shown in FIG. 9.

As a specific example of a method for directly weakly adhering upper base material 1A and lower base material 1B to an extent that they can be easily peeled apart, a method wherein a resin sheet substance immediately after being rolled out from an extruder, or a resin sheet substance that has been hot rolled with a calender roller, is superimposed onto another sheet substance and both sheets are compressed together with a press roll, can be used preferably.

Figure 8:
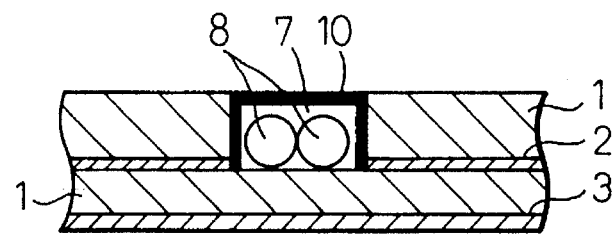
FIG. 8 is an explanatory drawing indicating an example of the state of protecting the cable in wiring grooves.
Figure 11:
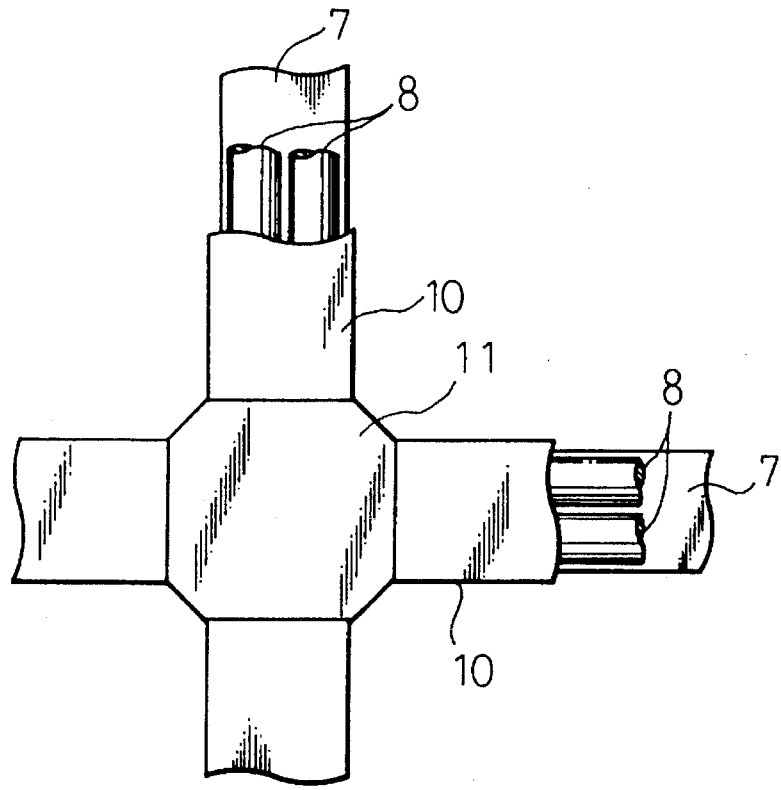
FIG. 11 is an explanatory drawing indicating an example of the state of protecting the cable at the intersection of corresponding wiring grooves.
Figure 12:
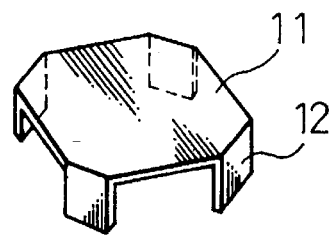
FIG. 12 is a perspective view of the protective cover shown in FIG. 11.

Furthermore, the flooring material for wiring of the present invention can be used at a size equal to that of tile carpeting, such as that in the shape of squares measuring 50 cm on a side, or in the form of wide, long sheets. Moreover, if a self-sticking tile carpet like that disclosed in, for example, Japanese Unexamined Patent Publication No. 61-273315 is used for the carpet that is laid over the upper surface of the flooring material for wiring of the present invention, the entire work process from wiring to laying of the tile carpeting can be performed extremely easily. In addition, if a cable protective cover made of plastic or metal and having enough strength to withstand the external force applied from above the carpet is placed over the flooring material after laying the cable in the formed grooves, damage to the cable by external force applied from above the carpet can be prevented. With respect to the shape of the cover in this case, it may be in the form of a covering sheet that covers the entire flooring material, or in the form of cover 10 having a cross-section in the shape of ⊓ which covers only cable 8 as shown in FIG. 8. In addition, for those portions where wiring grooves intersect, cover 11 can be used in the shape of an octagon and having four legs 12 as shown in FIGS. 11 and 12.

The following provides a more detailed explanation of the present invention based on its examples.

EXAMPLE 1

Polyester fiber non-woven fabric having a weight of 60 g/m$^2$ was supplied as support material on a conveyor belt composed of glass fiber woven fabric, the top surface of which was Teflon (trademark) coated. A first vinyl chloride sol having the composition shown below was coated to a thickness of 2 mm on its upper surface. A polyester fiber non-woven fabric having a structure the same as the above-mentioned support material was supplied on the upper surface of said first vinyl chloride sol as an intermediate layer. Moreover, a second vinyl chloride sol having the composition shown below was coated to a thickness of 5 mm onto the upper surface of said intermediate layer. This was then heat gelled under conditions of a temperature of 200° C. for 10 minutes in a heat treatment apparatus.

|  | [1st Vinyl Chloride Sol] | [2nd Vinyl Chloride Sol] |
| --- | --- | --- |
| Vinyl chloride | 100 parts | 100 parts |
| Plasticizer (DOP) | 88 parts | 90 parts |
| Calcium carbonate | 400 parts | 450 parts |
| Stabilizer | 1 part | 1 part |
| Pigment (carbon black) |  | 2 parts |
| Pigment (mixture of iron oxide and DOP: brick color) | 2 parts |  |

"DOP" refers to dioctyl phthalate.

The laminate formed in this manner was stamped into squares measuring 50 cm on a side. Moreover, four cuts each were made along cut lines 4 and 5 for forming vertical and horizontal grooves as shown in FIGS. 1 and 2 (interval between cut lines: 10 mm, 15 mm and 10 mm; depth: 5 mm) to manufacture the flooring material for wiring as claimed in the first gist of the present invention.

When portions 1*a* and 1*b* of the base material were peeled off from the resulting flooring material for wiring as shown in FIG. 3 at the site where wiring work was being performed, each portion could be easily peeled off with only a slight force from the upper surface of intermediate layer 2, and wiring grooves 6 and 7 were formed having uniform width and depth, namely a width of 15 mm and depth of 5 mm, and a width of 35 mm and depth of 5 mm.

EXAMPLE 2

A flooring material for wiring was manufactured in the same manner as Example 1 with the exception of using releasing paper, wherein silicon resin is coated onto the upper surface of kraft paper, for the intermediate layer. When portions 1*a* and 1*b* of the base material were peeled off as shown in FIG. 3 at the site where wiring work was being performed, each portion could be easily peeled off from the upper surface of intermediate layer 2 with less force than in the case of Example 1, and wiring grooves 6 and 7 were formed having uniform width and depth, namely a width of 15 mm and depth of 5 mm, and a width of 35 mm and depth of 5 mm.

EXAMPLE 3

Polyester fiber non-woven fabric having a weight of 60 g/m$^2$ was supplied as support material on a conveyor belt composed of glass fiber woven fabric, the top surface of which was Teflon coated. A same first vinyl chloride sol as in Example 1 was coated to a thickness of 2 mm on its upper surface. After gelling the sol to an extent that it did not stick by heating the top surface with a pre-heater, silicon resin was sprayed onto the upper surface to form a thin silicon resin film for the intermediate layer. Moreover, a same second vinyl chloride sol as in Example 1 was coated to a thickness of 5 mm onto the upper surface of said intermediate layer. This was then heat gelled under conditions of a temperature of 200° C. for 10 minutes in a heat treatment apparatus.

A flooring material for wiring was then manufactured in the same manner as Example 1 using the laminate formed in this manner when portions 1*a* and 1*b* of the base material were peeled off from the resulting flooring material for wiring as shown in FIG. 3 at the site where wiring work was being performed, each portion could be easily peeled off from the upper surface of intermediate layer 2 with only a small amount of force in the same manner as in the case of Example 2, and wiring grooves 6 and 7 were formed having uniform width and depth, namely a width of 15 mm and depth of 5 mm, and a width of 35 mm and depth of 5 mm.

EXAMPLE 4

Polyester fiber non-woven fabric having a weight of 60 g/m$^2$ was supplied as support material on a conveyor belt composed of glass fiber woven fabric, the top surface of which was Teflon coated. A first vinyl chloride sol having the same composition as Example 1 was coated to a thickness of 2 mm on its upper surface. A mixed non-woven fabric, consisting of 70% polyester fiber and 30% polyvinyl alcohol fiber and having a weight of 60 g/m$^2$ wherein roughly 80% of the polyvinyl alcohol fiber is unevenly distributed on the upper surface, was supplied on the upper surface of said first vinyl chloride sol as an intermediate layer. Moreover, a second vinyl chloride sol having the same composition as Example 1 was coated to a thickness of 5 mm onto the upper surface of said intermediate layer. This was then heat gelled under conditions of a temperature of 200° C. for 10 minutes in a heat treatment apparatus.

The laminate formed in this manner was stamped into squares measuring 50 cm on a side. Moreover, four cuts each were made along cut lines 4 and 5 for forming grooves in the same manner as Example 1 (interval between cut lines: 10 mm, 15 mm and 10 mm) to manufacture the flooring material for wiring as claimed in the second gist of the present invention.

when portions 1*a* and 1*b* of the base material were peeled off from the resulting flooring material for wiring as shown in FIG. 6 at the site where wiring work was being performed, each portion was integrated into a single unit with a portion of intermediate layer 2, and could be easily peeled off with only a slight force without breaking during the course of peeling, and wiring grooves 6 and 7 were formed having uniform width and depth, namely a width of 15 mm and depth of 5 mm, and a width of 35 mm and depth of 5 mm.

EXAMPLE 5

A flooring material for wiring was manufactured in the same manner as Example 4 with the exception of using releasing paper, wherein silicon resin is coated onto the lower surface of kraft paper, for the intermediate layer. When portions 1a and 1b of the base material were peeled off as shown in FIG. 6, each portion was integrated into a single unit with a portion of intermediate layer 2, and could be easily peeled off with less force than in the case of Example 4 without breaking during the course of peeling, and wiring grooves 6 and 7 were formed having uniform width and depth, namely a width of 15 mm and depth of 5 mm, and a width of 35 mm and depth of 5 mm.

EXAMPLE 6

Polyester fiber non-woven fabric having a weight of 60 g/m$^2$ was supplied as support material on a conveyor belt composed of glass fiber woven fabric, the top surface of which was Teflon coated. The above-mentioned first vinyl chloride sol having the same composition as Example 1 was coated to a thickness of 2 mm on its upper surface. A laminated non-woven fabric, wherein two sheets of a mixed non-woven fabric, consisting of 70% polyester fiber and 30% polyvinyl alcohol fiber and having a weight of 60 g/m$^2$ are laminated, was supplied on the upper surface of said first vinyl chloride sol as an intermediate layer. Moreover, the above-mentioned second vinyl chloride sol having the same composition as Example 1 was coated to a thickness of 5 mm onto the upper surface of said intermediate layer. This was then heat gelled under conditions of a temperature of 200° C. for 10 minutes in a heat treatment apparatus.

The laminate formed in this manner was stamped into squares measuring 50 cm on a side. Moreover, four cuts each were made along cut lines 4 and 5 for forming grooves in the same manner as Example 1 (interval between cut lines: 10 mm, 15 mm and 10 mm) to manufacture the flooring material for wiring as claimed in the third gist of the present invention.

When portions 1a and 1b of the base material were peeled off from the resulting flooring material for wiring as shown in FIG. 7 at the site where wiring work was being performed, each portion was integrated into a single unit with a portion of intermediate layer 2, and could be easily peeled off with only a slight force without breaking during the course of peeling, and wiring grooves 6 and 7 were formed having uniform width and depth, namely a width of 15 mm and depth of 5 mm, and a width of 35 mm and depth of 5 mm.

EXAMPLE 7

After heat kneading a composition composed of the substances shown below at the following blending ratios, the composition was hot rolled with a calender roll followed by cooling to form a sheet having a thickness of 2 mm. Next, the previously formed sheet having a thickness of 2 mm was superimposed over another sheet having the same composition while hot rolling to a thickness of 5 mm with a calender roll, after which the sheets were compressed with a press roll.

The laminate formed in this manner was stamped into squares measuring 50 cm on a side. Moreover, four cuts each were made along cut lines 4 and 5 for forming grooves in the same manner as Example 1 (interval between cut lines: 10 mm, 15 mm and 10 mm) that extended to lower base material 1B to manufacture the flooring material for wiring as claimed in the fourth gist of the present invention.

Figure 10:
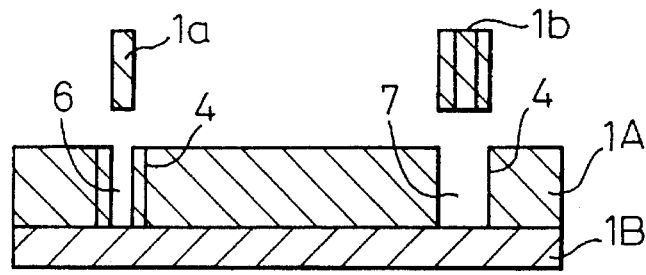
FIG. 10 is a cross-sectional view of a flooring material for wiring indicating an example of the case of forming wiring grooves using a flooring material for wiring as claimed in the fourth gist of the present invention.

When portions 1a and 1b of the base material were peeled off from the resulting flooring material for wiring as shown in FIG. 10 at the site where wiring work was being performed, each portion could be easily peeled off with only a slight force from the interface between upper base material 1A and lower base material 1B, and wiring grooves 6 and 7 were formed having uniform width and depth, namely a width of 15 mm and depth of 5 mm, and a width of 35 mm and depth of 5 mm.

| | |
|---|---|
| Vinyl chloride | 100 parts |
| Plasticizer (DOP) | 60 parts |
| Calcium carbonate | 200 parts |
| Barium stearate | 5 parts |
| Carbon black | 1 part |

EXAMPLE 8

A composition composed of the substances shown below at the following blending ratios was supplied to an extruder, and superimposed with a sheet having a thickness of 2 mm that was the same as that used in Example 7 while extruding to a thickness of 5 mm, after which the two sheets were compressed with a press roll.

A flooring material for wiring was manufactured in the same manner as Example 7 using the laminate formed in this manner. When wiring grooves were formed in the same manner as Example 7 at the site where wiring work was being performed, wiring grooves 6 and 7 were formed having uniform width and depth in the same manner as Example 7.

| | |
|---|---|
| Atactic polypropylene | 100 parts |
| Calcium carbonate | 200 parts |

EXAMPLE 9

A composition composed of the substances shown below at the following blending ratios was supplied to an extruder and superimposed with a calcium silicate sheet having a thickness of 2 mm while extruding to a thickness of 5 mm and reheating the surface, after which the sheets were compressed with a press roll.

A flooring material for wiring was manufactured in the same manner as Example 7 using the laminate formed in this manner. When wiring grooves were formed in the same manner as Example 7 at the site where wiring work was being performed, wiring grooves 6 and 7 were formed having uniform width and depth in the same manner as Example 7.

| | |
|---|---|
| Ethylene-vinyl acetate copolymer | 100 parts |
| Calcium carbonate | 100 parts |
| Paraffin | 20 parts |

According to the present invention composed in the manner described above, by simply interpositioning a specific intermediate layer within a base material or weakly adhering an upper base material and lower base material without interpositioning an intermediate layer, the present invention offers the advantage of being able to form wiring grooves having uniform width and depth extremely easily and reliably.

We claim:

1. A flooring material for wiring, comprising a sheet base material having an upper and lower surface, having interpositioned within said sheet base material an intermediate layer having an upper and lower surface, a plurality of cut lines of a depth that extends from the upper surface of the sheet base material to at least the upper surface of the intermediate layer are provided at suitable intervals in a vertical and/or horizontal direction to form cut sections peelable from said sheet base material, said intermediate layer being interpositioned in said sheet base material so that it forms bottoms of wiring grooves by removal of sections of said sheet base material.

2. A flooring material for wiring, comprising a sheet base material having an upper and lower surface, having interpositioned within said sheet base material an intermediate layer having an upper and lower surface, a plurality of cut lines of a depth that extends from the upper surface of the sheet base material to at least the lower surface of the intermediate layer are provided at suitable intervals in a vertical and/or horizontal direction to form cut sections, the upper surface of said intermediate layer being peelable along said cut lines from said sheet base material but more strongly adhered to the sheet base material than its lower surface, said intermediate layer being interpositioned in said sheet base material such that it forms bottoms of wiring grooves by removal of sections of said sheet base material.

3. A flooring material for wiring comprising a sheet base material having an upper and lower surface, having interpositioned within said sheet base material an intermediate layer consisting of a laminated sheet having upper, intermediate and lower surfaces, a plurality of cut lines of a depth that extends from the upper surface of the sheet base material to at least the lower surface of the intermediate layer are provided at suitable intervals in a vertical and/or horizontal direction to form cut sections, the laminated sheet being peelable along said cut lines at its intermediate layer surface, the upper and lower surfaces of the laminated sheet more strongly adhering to the sheet base material than at the intermediate surfaces, said intermediate layer being interpositioned in said sheet base material such that it forms bottoms of wiring grooves by removal of sections of said sheet base material.

4. A flooring material for wiring, comprising a sheet base material being divided into upper and lower portions, along said cut lines the lower portion being capable to form bottoms of wiring grooves by removal of a cut section of said upper portion, the upper base material portion and lower base material portion being directly and peelably adhered to each other.

5. A flooring material for wiring as set forth in claim 1, wherein the sheet base material is of a synthetic resin, rubber, wood or metal, and the intermediate layer is of a non-woven fabric, woven fabric, knitted fabric, paper or film.

6. A flooring material for wiring as set forth in claim 2, wherein the sheet base material is of a synthetic resin, rubber, wood or metal, and the intermediate layer is of a non-woven fabric, woven fabric, knitted fabric, paper or film.

7. A flooring material for wiring as set forth in claim 3, wherein the sheet base material is of a synthetic resin, rubber, wood or metal, and the intermediate layer is of a non-woven fabric, woven fabric, knitted fabric, paper or film.

8. A flooring material for wiring as set forth in claim 4, wherein the sheet base material is of a synthetic resin, rubber, wood or metal.

\* \* \* \* \*